United States Patent
Prabhu et al.

(10) Patent No.: US 6,675,292 B2
(45) Date of Patent: Jan. 6, 2004

(54) EXCEPTION HANDLING FOR SIMD FLOATING POINT-INSTRUCTIONS USING A FLOATING POINT STATUS REGISTER TO REPORT EXCEPTIONS

(75) Inventors: J. Arjun Prabhu, Palo Alto, CA (US); Douglas M. Priest, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 56 days.

(21) Appl. No.: 09/374,052

(22) Filed: Aug. 13, 1999

(65) Prior Publication Data

US 2003/0028759 A1 Feb. 6, 2003

(51) Int. Cl.$^7$ ............................................. G06F 15/00
(52) U.S. Cl. ........................ 712/244; 712/22; 712/222
(58) Field of Search ................................ 712/244, 222, 712/22

(56) References Cited

U.S. PATENT DOCUMENTS

| | | | |
|---|---|---|---|
| 5,123,095 A | * 6/1992 | Papadopoulos et al. | 712/218 |
| 5,685,009 A | * 11/1997 | Blomgren et al. | 712/23 |
| 5,805,918 A | 9/1998 | Blomgren et al. | 395/800.43 |
| 5,826,069 A | * 10/1998 | McCullough et al. | 712/220 |
| 5,872,965 A | 2/1999 | Petrick | 712/236 |
| 5,892,966 A | 4/1999 | Petrick et al. | 712/36 |
| 6,021,488 A | 2/2000 | Eisen et al. | 712/228 |
| 6,038,652 A | * 3/2000 | Phillips et al. | 712/22 |
| 6,304,963 B1 | * 10/2001 | Elwood | 712/244 |

OTHER PUBLICATIONS

SPARC International, Inc., The SPARC Architecture Manual, Version 8, Sep. 1, 1991, pp. 23–41.*
Hennessy, John L. et al., Computer Organization & Design, 1997 Morgan Kaufmann Publishers, Inc., 2$^{nd}$ Ed., pp. 748–749.*
Hennessy et al., Computer Architecture A Quantitative Approach, 1990, Morgan Kaufmann Publishers, Inc., pp. 572–573.*

(List continued on next page.)

*Primary Examiner*—Richard L. Ellis
*Assistant Examiner*—Tonia L. Meonske
(74) *Attorney, Agent, or Firm*—Gunnison, McKay & Hodgson, L.L.P.; Philip J. McKay

(57) ABSTRACT

A method, apparatus, and computer program product for handling IEEE 754 standard exceptions for Single Instruction Multiple Data (SIMD) instructions. Each SIMD sub-operation's corresponding IEEE 754 exception flag is bit-wise "ORed" with an accrued exception field if a trap enable mask field is configured to mask the exception, with the "ORed" result written back in the accrued exception field. If the trap enable mask field is configured to enable the exception, the accrued exception field and a current exception field are cleared, and an unfinished floating-point exception flag is set in a floating-point trap type field. The actual sub-operation(s) causing the exception is determined through software.

2 Claims, 5 Drawing Sheets

OTHER PUBLICATIONS

Sun Numerical Computation Guide: 2—IEEE Arithmetic—Date Not Provided.

Sun Numerical Computation Guide: 4—Exceptions and Exception Handling—Date Not Provided.

Sun Numerical Computation Guide, Addendum to Appendix D, Differences Among IEEE 754 Implementations Date Not Provided.

VIS Instruction Set User's Manual 1.2 Ultra SPARC–I—Date Not Provided.

VIS Instruction Set User's Manual 2.1 Ultra SPARC Concepts—Date Not Provided.

VIS Instruction Set, Ultra SPARC™ The Visual Instruction Set On Chip Support for New Media Processing Date Not Provided.

RAID with VIS, VIS™ in RAID Controllers—Date Not Provided.

Floating Point Representation of Numbers—Date Not Provided.

* cited by examiner

EXCEPTION HANDLING FOR SIMD FLOATING POINT-INSTRUCTIONS USING A FLOATING POINT STATUS REGISTER TO REPORT EXCEPTIONS

BACKGROUND OF THE INVENTION

1. Field of the Invention

The present invention relates to Single Instruction Multiple Data (SIMD) computer operations, and more specifically to floating-point exception handling for SIMD operations.

2. Relevant Background

As general-purpose computer processors become ever more powerful, there is an increasing demand for the capability of high speed graphics calculations. Fueling this demand is the growth of such applications as video conferencing, 3-D modeling, computer animation, electronic publishing, and virtual reality. Processors that can provide high-speed graphical support for two and three dimensional imaging, video and audio processing, and image compression have a competitive edge as high-volume applications emerge in the informational and professional markets.

Typically, graphics calculations involve multiple floating-point arithmetic operations such as addition and multiplication. Many computer processors have adopted the IEEE Standard for Binary Floating-Point Arithmetic, ANSI/IEEE Std 754-1985, referred herein as "IEEE 754". Examples of such processors include UltraSPARC systems offered by Sun Microsystems, the PowerPC processor available from Motorola Inc. and International Business Machines Corp., and any of the Pentium or x86 compatible processors available from the Intel Corporation or other corporations such as AMD and Cyrix. The IEEE 754 standard includes specifications for floating-point storage formats, floating-point precision and accuracy ranges, data type conversions, rounding operations, and floating-point exceptions.

There are five types of floating-point exceptions defined by the IEEE 754 standard: inexact, divide-by-zero, underflow, overflow, and invalid. An exception, as used herein, is an error condition often requiring software intervention for the processor to continue executing the current instruction stream. When an exception occurs, a specific exception handler routine associated with the exception is executed. However, it is generally possible to disable, or mask, an exception such that the exception handler is not invoked when the exception occurs. Table 1 contains a summary of each IEEE 754 defined exception.

TABLE 1

| IEEE 754 exceptions | |
| --- | --- |
| Exception Name | Exception Description |
| Inexact | The rounded result differs from the infinitely precise unrounded result |
| Divide-By-Zero | The divisor is zero |
| Underflow | The result is smaller in magnitude than the smallest number in the destination range |
| Overflow | The result is larger in magnitude than the largest number in the destination range |
| Invalid | An invalid operation is about to be performed |

Processors typically utilize floating-point status registers to flag IEEE 754 exceptions that occur during floating-point calculations. Often, a bank of five bits, corresponding to the five IEEE 754 defined exceptions, is used to flag any IEEE 754 exception which occurs during the currently executing floating-point instruction. In addition, another bank of five bits may be used to mask IEEE 754 exceptions, in which case another set of five bits is typically used to keep track of any accrued IEEE 754 exceptions which were masked.

In an effort to increase the speed of graphics calculations, some processor include a specialized set of program instructions which quickly perform sophisticated floating-point graphics calculations. These specially tailored graphics instructions may execute complex graphics operations that customarily required dozens of clock cycles in as little as one clock cycle, thereby increasing the throughput of graphics based calculations. One category of instructions employed to speed graphics operations is referred to as Single Instruction Multiple Data (SIMD) instructions. For example, SIMD instructions may be designed in accordance with the Visual Instruction Set (VIS™) developed by Sun Microsystems. VIS™ is a trademark of Sun Microsystems, Inc. in the United States and in other countries. Alternatively, SIMD instructions could be modeled to work with the MMX instruction set designed by Intel Corporation.

SIMD instructions include a main operation code (opcode) and a plurality of sub-operations. The sub-operations are typically floating-point calculations which are executed in parallel. One complexity of executing multiple floating-point instructions in parallel is that each floating-point instruction may generate its own IEEE 754 exception. In general, processors with architecture supporting regular floating-point instructions and SIMD floating-point instructions could require a separate copy of the floating-point status register for each floating-point instruction executed in parallel. Thus, multiple copies of current exception flags, accrued exception flags, and trap enable mask bits may be needed (i.e. one copy for regular floating-point instructions and one copy for each SIMD sub-operation). This is costly in hardware to implement. In addition, any modifications to the floating-point status register configuration is extremely undesirable when dealing with an existing processor, architecture.

What is needed is a mechanism to keep track of IEEE 754 exceptions during execution of SIMD floating-point instructions as well as regular floating-point instructions. This mechanism should use existing configurations of the floating-point status registers, such that processor architecture remains unchanged. The mechanism should not require maintaining multiple copies of floating-point status registers or multiple copies of exception flags for each SIMD sub-operation.

SUMMARY OF THE INVENTION

Briefly stated, the present invention involves a method for handling an IEEE 754 standard exception for a SIMD instruction with a plurality of sub-operations. The method includes the operations of determining if a trap enable mask field is configured to mask or. enable the exception; performing a bit-wise logical "OR" function of corresponding exception flags of the sub-operations with an accrued exception flag field if the trap enable mask field is configured to mask the exception; and updating the accrued exception flag field with a result of the OR function.

Another aspect of the invention is a method for handling IEEE 754 standard exceptions. The method includes providing a floating-point trap type field configured to indicate a floating-point exception cause; a trap enable mask field configured to selectively mask or enable IEEE 754 standard exceptions, where the trap enable mask field includes flags corresponding to each of the IEEE 754 standard exceptions; a current exception field configured to indicate the occurrence of enabled IEEE 754 standard exceptions, where the current exception field includes flags corresponding to each of the IEEE 754 standard exceptions; and an accrued exception field configured to indicate the occurrence of masked IEEE 754 standard exceptions, where the accrued exception field includes flags corresponding to each of the IEEE 754 standard exceptions. The method further includes executing a SIMD instruction comprising a plurality of sub-operations, where the SIMD instruction causes an IEEE 754 exception; determining if the trap enable mask field is configured to mask or enable the exception; performing a bit-wise logical "OR" function of corresponding exception flags of the sub-operations with the accrued exception field if the trap enable mask field is configured to mask the exception; updating the accumulated exception flag field with a result of the OR function if the trap enable mask field is configured to mask the exception; clearing the accrued exception field and the current exception field if the trap enable mask field is configured to enable the exception; setting an exception flag in the floating-point trap type field if the trap enable mask field is configured to enable the exception; and determining which of the sub-operations generated the exception.

In accordance with another aspect of the invention, the invention is an apparatus suitable for handling an IEEE 754 standard exception for a SIMD instruction with a plurality of sub-operations. The apparatus includes a trap enable mask field configured to selectively mask or enable IEEE 754 standard exceptions, where the trap enable mask field includes flags corresponding to each of the IEEE 754 standard exceptions; an accrued exception field configured to indicate the occurrence of masked IEEE 754 standard exceptions, where the accrued exception field includes flags corresponding to each of the IEEE 754 standard exceptions; "OR" logic operatively coupled to the accrued exception field to generate a bit-wise logical "OR" of corresponding exception flags of the sub-operations with the accrued exception field if the trap enable mask field is configured to mask the exception; and a resulting bit pattern from the "OR" logic, where the resulting bit pattern is written to the accrued exception field if the trap enable mask field is configured to mask the exception.

Still another aspect of the invention is a computer program product embodied in a tangible media suitable for handling an IEEE 754 standard exception for a SIMD instruction including a plurality of sub-operations. The tangible media may include a magnetic disk, an optical disk, a propagating signal, or a random access memory device.

DETAILED DESCRIPTION OF THE INVENTION

A processor designed in accordance with the present invention includes hardware support for executing of Single Instruction Multiple Data (SIMD) instructions. SIMD instructions are typically used to compute large amounts of information, such as 3-D graphics and multimedia information. Generally, a SIMD instruction contains a plurality of sub-operations which are executed by a processor at the same time.

Figure 1:
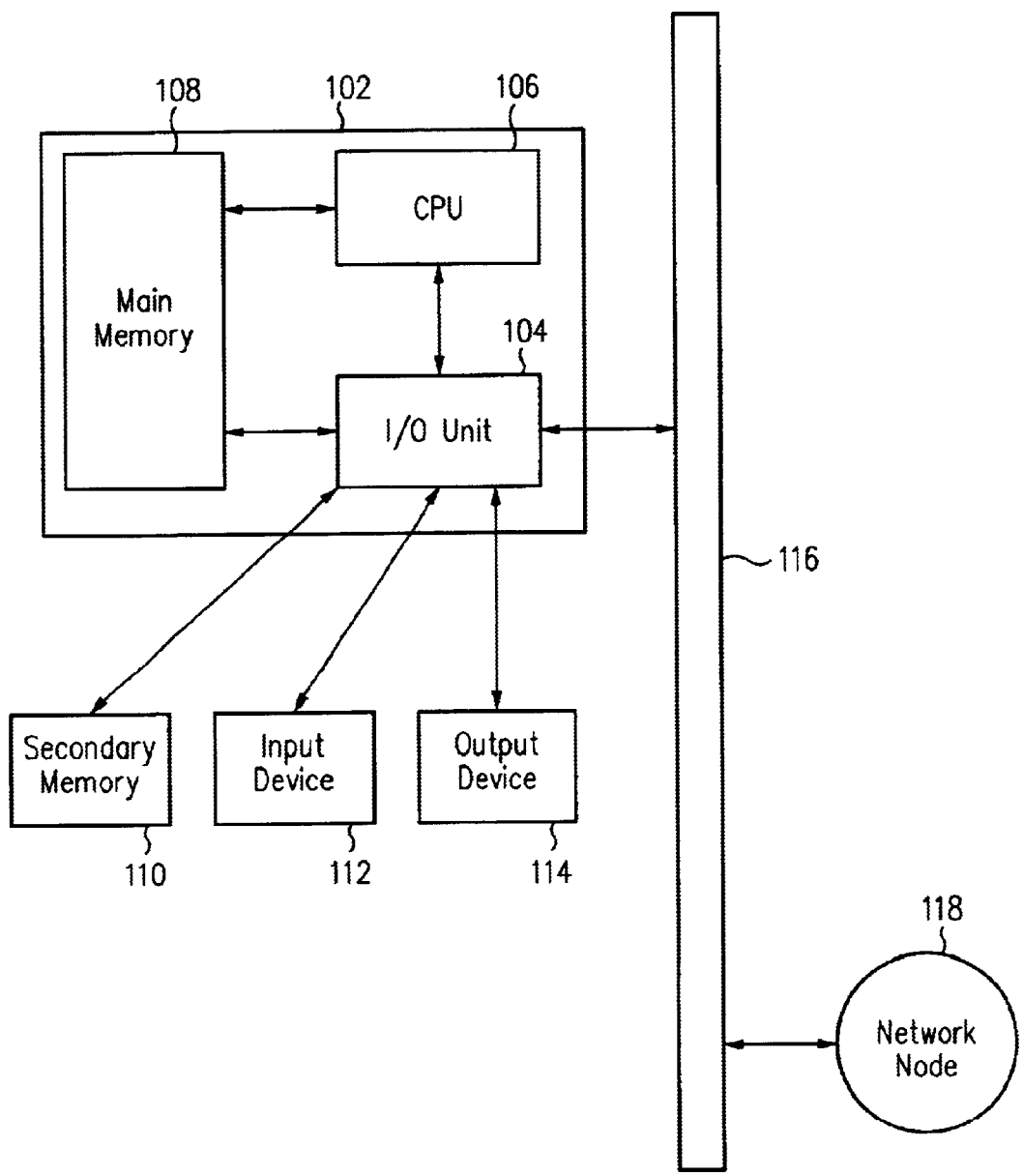
FIG. 1 shows an exemplary computing environment in which the present invention may be implemented.

One operating environment in which the present invention is potentially useful encompasses the general purpose computer. Examples of such computers include SPARC systems offered by Sun Microsystems, the PowerPC processor available from Motorola Inc. and International Business Machines Corp., or any of the Pentium or x86 compatible processors available from the Intel Corporation or other corporations such as AMD and Cyrix. Some of the elements of a general purpose computer are shown in FIG. 1, wherein a processor 102 is shown having an input/output (I/O) unit 104, a central processing unit (CPU) 106, and a main memory unit 108.

The main memory unit 108 generally stores program instructions and data used by the processor 102. Instructions and instruction sequences implementing the present invention may be embodied in memory 108 for example. The main memory unit 108 may also include relatively faster and smaller cache memory which contains blocks of frequently accessed program and data memory locations. Various types of memory technologies may be utilized in the main memory unit 108, such as Random Access Memory (RAM), Read Only Memory (ROM), and Flash memory.

The I/O unit 104 connects with a secondary memory unit 110, an input device unit 112, and an output device unit 114. The secondary memory unit 110 represents one or more mass storage devices which may include hard disks, floppy disks, optical disks, and tape drives. Secondary memory 110 is typically slower than main memory 108, but can store more information for the same price. The input device unit 112 may include input hardware such as a keyboard or mouse. The output device unit 114 typically includes devices such as a display adapter, a monitor, a printer, a sound card, and speakers.

The I/O unit 104 may further be connected to a network 116 via a network adapter (not shown). Generally, the processor 102 and other network nodes 118 transmit information utilizing TCP/IP protocol. Other network protocols such as SNA, X.25, Novell Netware, Vines, or Apple Talk could also be used to provide similar client-server communication capabilities.

Arrows in FIG. 1 represent the system bus architecture of the computer, however, these arrows are for illustrative purposes only. It is contemplated that other interconnection schemes serving to link the system components may be used in the present invention. For example, a local video bus could be utilized to connect the CPU 106 to an output device 114, even though a direct arrow between the CPU 106 and the output device 114 is not shown.

Figure 2:
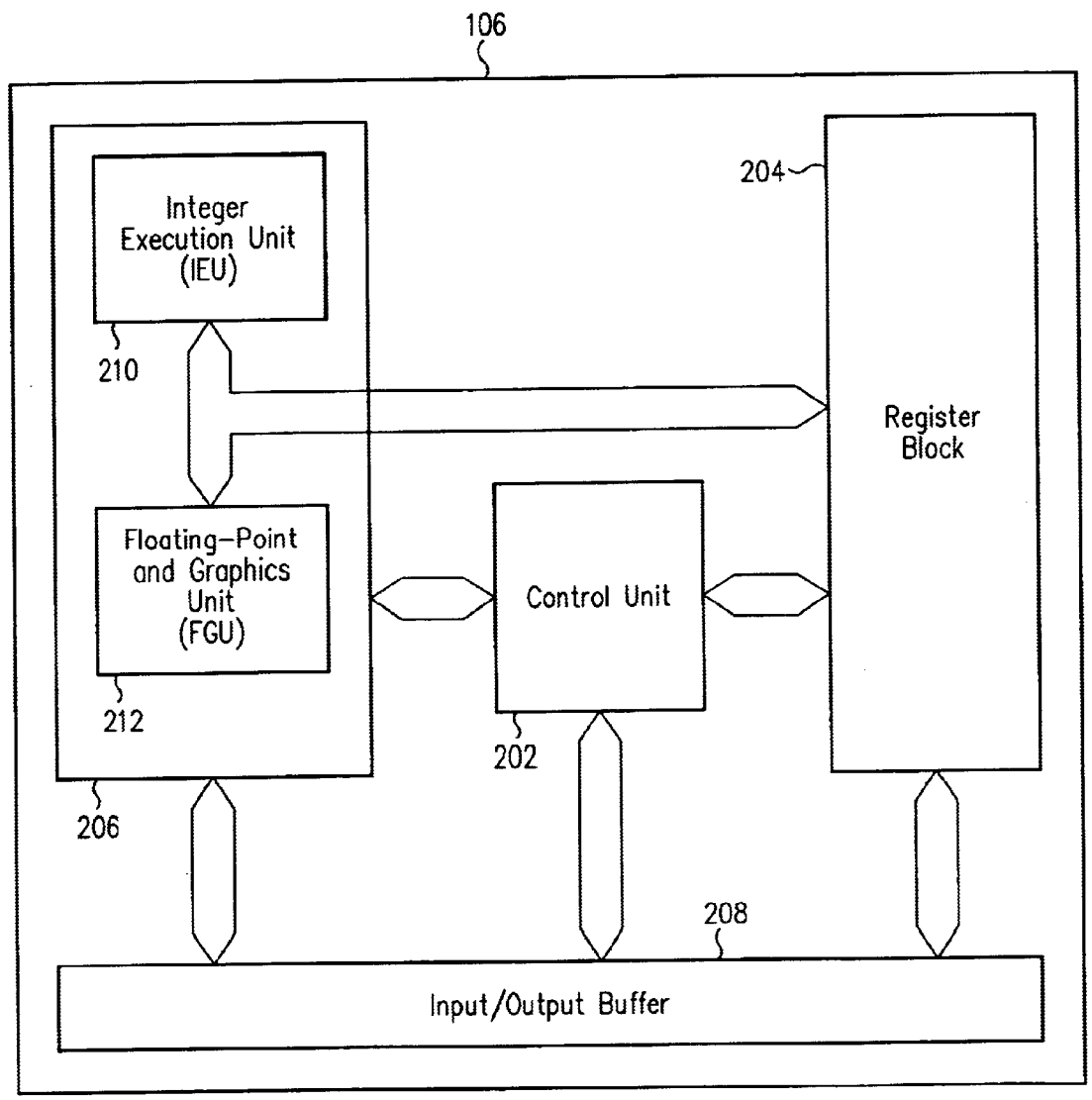
FIG. 2 shows a simplified representation of a central processing unit (CPU) embodying the present invention.

FIG. 2 shows a simplified representation of the CPU 106. The CPU 106 includes a control unit 202 connected to a resister block 204, a core execution block 206, and an input/output buffer 208.

The input/output buffer 208 is responsible for fetching instructions and data from main memory or cache and passing them to the control unit 202. The input/output buffer 208 also sends information from the CPU 106 to other parts of the processor 102 and handles cache management and mapping.

The control unit 202 controls instruction execution and the movement of data within the CPU. Instruction execution may be carried out using a pipelined schedule, wherein at any one time several instructions may be at various stages of execution within the CPU 106. The control unit 202 manages the instruction pipeline by, for example, decoding instructions, checking for dependencies between instructions in the pipeline, allocating and scheduling CPU resources, and carrying out instruction renaming. Instruction renaming may involve generating helper instructions for more complex instructions.

In addition to managing the instruction pipeline, the control unit 202 maintains the correct architectural state of the CPU. Maintaining the CPU state generally requires updating special control and status registers within the register block 204. For example, the control unit 202 maintains a program counter register used to locate the next program instruction to be executed. Control and status registers are described in greater detail below. In addition, the control unit 202 may feature a branch prediction mechanism, wherein historical analysis of past branch results are used to predict future branch results, thereby improving the pipeline efficiency.

The register block 204 is essentially a specialized group of memory locations which are read and written by the core execution block 206 and the input/output buffer 208. Typically, registers are designated as either general purpose registers or control and status registers. General purpose registers hold data and address information and are manipulated by the instructions running in the CPU 106. General purpose registers can be further categorized as either integer registers or floating-point registers. Often, the integer registers are only visible to the integer execution unit (IEU) 210 and the floating-point registers are only visible to the floating-point and graphics unit (FGU) 212. Status and control registers contain condition and control codes relating to the processor's operation. Although some status and control registers can be modified by program instructions, many registers may be configured as read only.

The core execution block 206 carries out processor computations and data manipulation. Although there are many core execution block design configurations which may be used with the present invention, the exemplary embodiment of the core execution block 206 shown in FIG. 2 is divided into an integer execution unit (IEU) 210 and a floating-point and graphics unit (FGU) 212.

The IEU 210 is responsible for integer-based arithmetic and logical computations in the CPU 106. Arithmetic computations include virtual address calculations as well as data calculations. Typically, the IEU 210 receives a partially decoded integer instruction from the control unit 202. The IEU 210 conducts a final decode of the instruction and then executes the instruction.

The FGU 212 is responsible for performing floating-point and graphics instructions. The FGU 212 receives partially decoded instructions from the control unit 202, completes the instruction decode, and performs floating-point operations as required by the current instruction.

Figure 3:
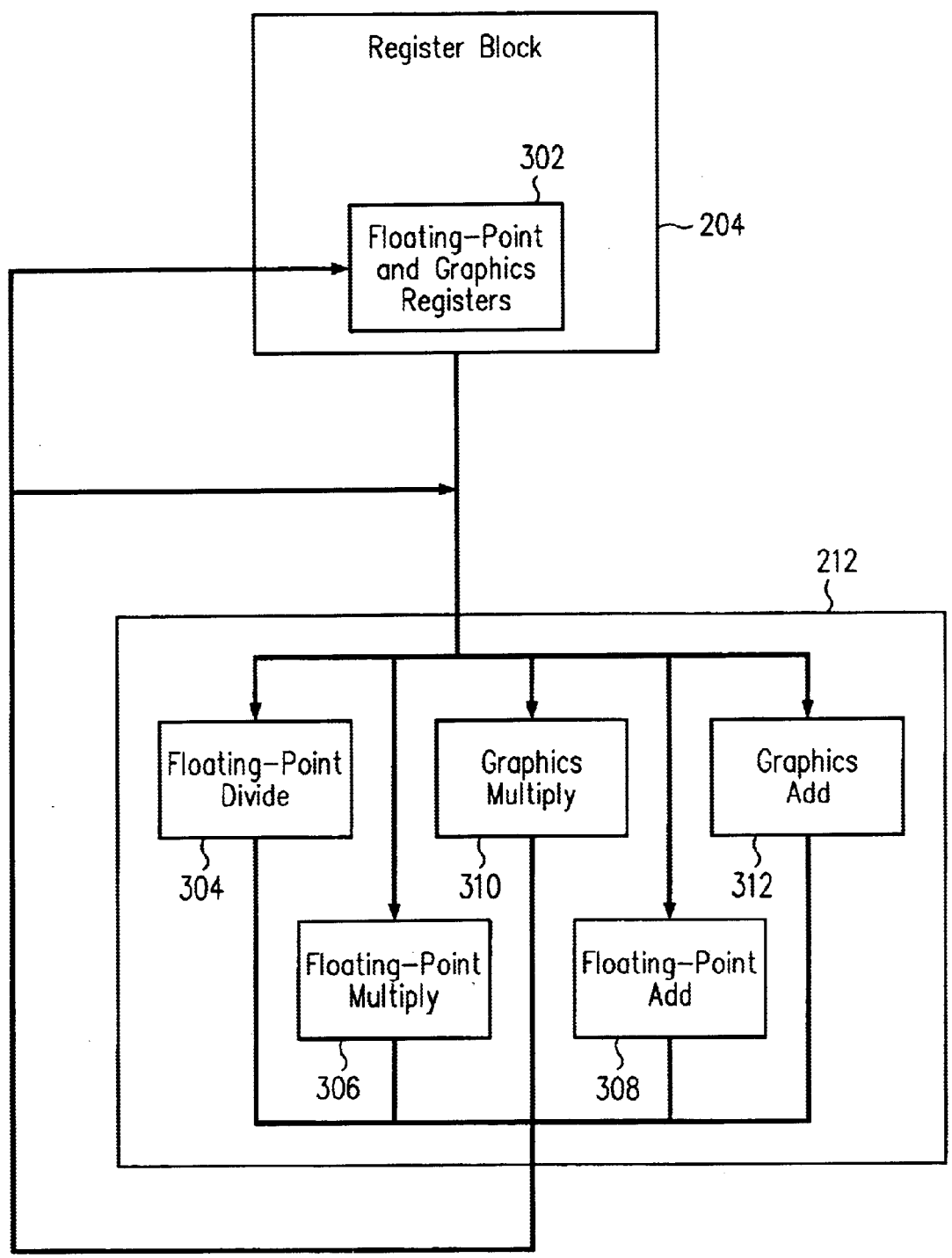
FIG. 3 shows a more detailed block diagram illustrating functional units contained within a floating-point and graphics unit (FGU) of the CPU.

FIG. 3 is a more detailed block diagram illustrating the functional units contained within the floating-point and graphics unit (FGU) 212. In a particular embodiment of the invention, the FGU 212 includes functional units capable of performing various floating-point and graphical operations in parallel. FGU registers 302 are used to store data operated on by the FGU 212. The FGU registers 302 can be located in the register block 204 as shown, or alternatively, can be incorporated within the FGU 212 itself. Three of the FGU functional units are configured as a floating-point divider 304, a floating-point multiplier 306, and a floating-point adder 308. The remaining two functional units are a graphics multiplier 310 and a graphics adder 312. The resulting calculations from the FGU 212 can be sent back to the FGU registers 302 or to each of the functional units via bypass.

The functional units within the FGU 212 perform floating-point and graphics instructions. Of particular importance to the present invention is the mechanism which handles occurrences of IEEE 754 exceptions during the execution of SIMD instructions. As previously described, the IEEE 754 standard defines five types of floating point exceptions: invalid operation, overflow, underflow, division by zero, and inexact. During execution of SIMD instructions, an IEEE 754 exception may result from execution of one or more of the sub-operations within the SIMD instruction. The present invention utilizes a floating-point status register to report IEEE 754 exceptions generated from one or more of the sub-operations within the SIMD instruction.

Figure 4:
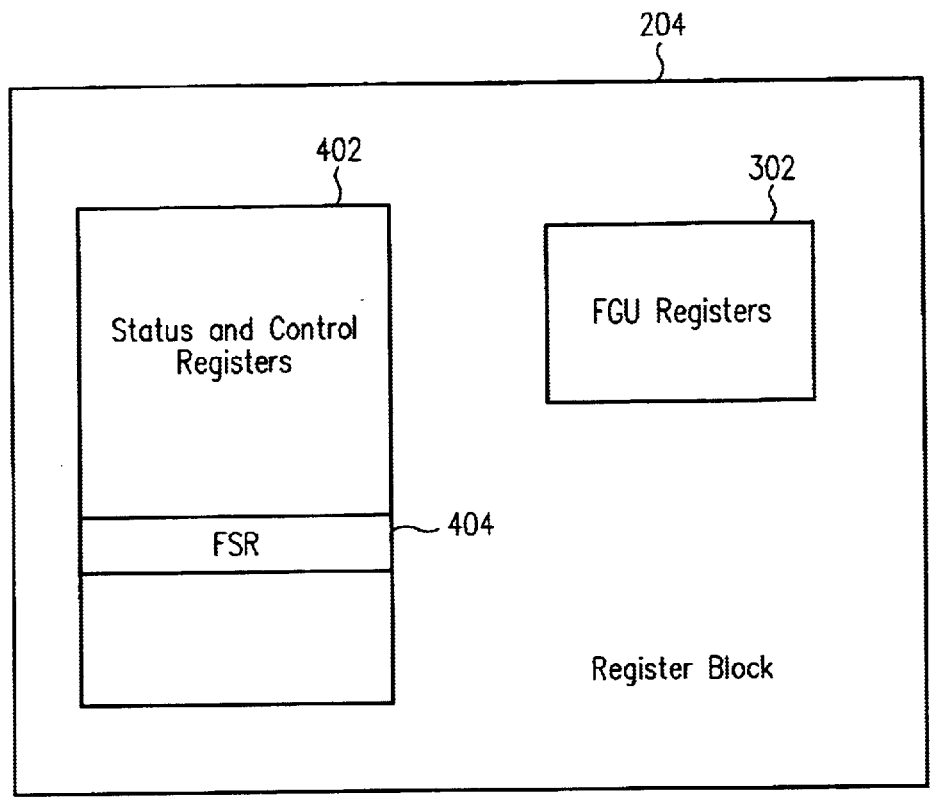
FIG. 4 shows a more detailed representation of a register block within the CPU.

In FIG. 4, a more detailed representation of the register block 204 is shown. As earlier mentioned, the register block typically includes a set of FGU registers 302 and a set of status and control registers 402. The present invention uses an IEEE 754 exception status register to handle IEEE 754 exceptions for both SIMD instructions and regular floating-point instructions. In an exemplary embodiment of the present invention, the IEEE 754 exception register is the floating-point status register (FSR) 404 as specified in the SPARC-V9 architectural requirements. The present invention, however, may be embodied in other processor designs using similar floating-point registers such as the PowerPC, x86, and IA64 based processors.

Figure 5:
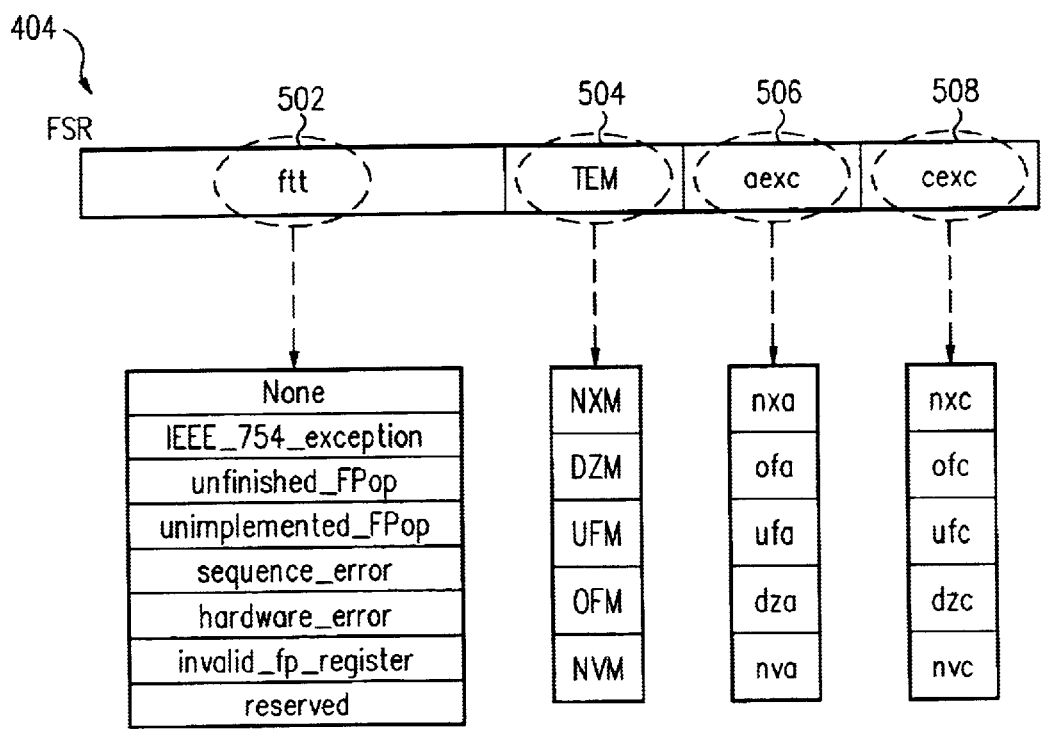
FIG. 5 shows a more detailed partial representation of a floating-point status register (FSR) within the register block.

FIG. 5 shows a more detailed partial representation of the floating-point status register (FSR) 404. The FSR 404 is configured to report current and accrued IEEE 754 exceptions, and allows for masking of IEEE 754 exceptions. The FSR 404 includes a floating-point trap type (FTT) field 502, a trap enable mask (TEM) field 504, an accrued exception (AEXC) field 506, and a current exception (CEXC) field 508. The FSR 404 includes other floating-point status and control fields which are omitted in FIG. 5 for clarity purposes.

The FTT field 502 identifies the cause of floating-point exception traps. In a particular embodiment, the FTT field 502 is eight bits in length, with each bit associated to a particular floating-point exception cause. For example, if the second bit of the FTT field 502 is set, this indicates an IEEE 754 exception has occurred in the FGU 212. Particular architectures and implementations may specify a number of other floating point exceptions beyond those required by IEEE 754. Other floating-point exceptions indicated by the FTT field 502 include an unfinished floating-point operation (unfinished_FPop), an unimplemented floating-point operation (unimplemented_FPop), a sequence error (sequence_error), a hardware error (hardware_error), and a floating-point instruction misalignment (invalid_fp_register). These other exceptions are not specified in the IEEE 754 standard.

The accrued exception (AEXC) field 506 and the current exception (CEXC) field 508 contain five bits each used to indicate which one of the five IEEE 754 exceptions has occurred. Table 2 lists each of the five AEXC and CEXC bits, along with their corresponding IEEE 754 exception.

TABLE 2

AEXC and CEXC field bits

| AEXC bit | CEXC bit | Exception Name |
|---|---|---|
| nxa | nxc | Inexact |
| dza | dzc | Divide-By-Zero |
| ufa | ufc | Underflow |
| ofa | ofc | Overflow |
| nva | nvc | Invalid |

The TEM field 504 also contains five bits, with each bit used to either enable or mask a particular IEEE 754 exception. Table 3 contains a description of each TEM bit.

TABLE 3

TEM field bits

| TEM Bit | Bit Description |
|---|---|
| NXM | Masks an Inexact exception |
| DZM | Masks a Divide-By-Zero exception |
| UFM | Masks an Underflow exception |
| OFM | Masks an Overflow exception |
| NVM | Masks an Invalid exception |

In accordance with the present invention, the action taken by the processor in response to an IEEE 754 exception is dependent on whether the executed floating-point instruction is a SIMD instruction or a regular floating-point instruction.

If an IEEE 754 exception occurs during execution of a regular floating-point instruction, the TEM field 504 is first checked to determine if the exception is masked. If the exception is masked by the TEM field 504, the bit corresponding to the exception in the AEXC field 506 is set, and the CEXC field 508 is cleared. Any AEXC bit that was set before the instruction was executed is preserved. This is accomplished by logically ORing the AEXC bits with the corresponding detected IEEE 754 exception bits and storing the result back in the AEXC field 506. If the IEEE 754 exception is not masked by the TEM field 504, the corresponding exception bit of the CEXC field 508 is set, with the other CEXC bits cleared. In addition, the FTT field 502 is set to IEEE_754_exception, and the AEXC field 506 is left unchanged. Once the FSR fields are updated, the appropriate IEEE 754 exception handler is then executed.

If an IEEE 754 exception occurs during execution of a SIMD instruction, the TEM field 504 is again first checked to determine if the exception is masked. If the exception is masked, then each SIMD sub-operation which caused an IEEE 754 exception sets the corresponding exception bit in the AEXC field 506. For example, if one SIMD sub-operation causes a divide-by-zero exception and another SIMD sub-operation causes an overflow exception, both exception bits are set in the AEXC field 506. The other AEXC bits are preserved by logically ORing the preexisting AEXC field 506 with the IEEE 754 exception bits of the sub-operations, with the result stored back in the AEXC field 506. It is contemplated that the CEXC field 508 may or may not be cleared before executing the next instruction, depending on implementation convenience.

In the event that an IEEE 754 exception occurs during execution of a SIMD instruction and the exception is not masked by the TEM field 504, both the AEXC field 506 and the CEXC field 508 are cleared. Next, the FTT field 502 is set to unfinished_FPop, and the unfinished floating-point exception handler is executed. It is contemplated that other processor architectures and implementations may use a different floating-point trap type flag to signal the occurrence of unmasked IEEE 754 exceptions during SIMD instruction execution.

Figure 6:
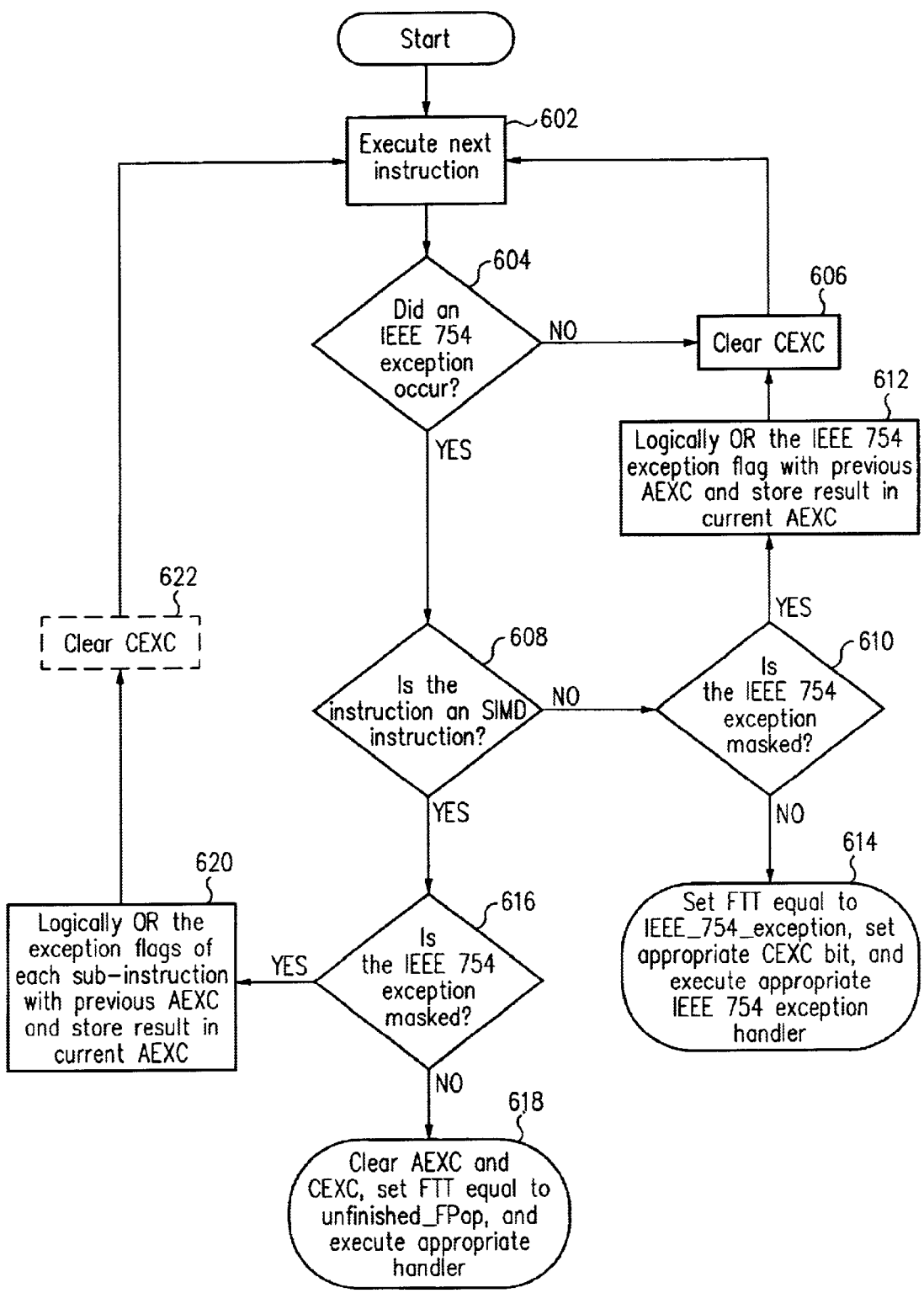
FIG. 6 shows a flow chart of the steps taken when a floating-point operation is executed under the present invention.

FIG. 6 shows a flow chart of the steps taken when a floating-point operation is executed under the present invention. At step 602, a computer instruction is performed. Next, at step 604, a decision block checks if an IEEE 754 exception occurred during the instruction's execution. If an IEEE 754 exception did not occur, step 606 clears the CEXC field and another instruction is executed at step 602. This flow path is independent of whether an SIMD or a regular floating-point instruction is executed.

If executing the instruction results in an IEEE 754 exception, step 608 checks if the instruction was an SIMD instruction. If the instruction was a regular non-SIMD instruction, step 610 checks if the exception is masked by the TEM field 504 (see FIG. 5). If the exception is masked, step 612 logically ORs the corresponding IEEE 754 exception bit with the previous AEXC field, and places the resulting value back in the AEXC field. This updates the AEXC field bits without clearing any bits that were set by previously masked IEEE 754 exceptions. In addition, the CEXC field is cleared at step 606, and the next instruction is executed at step 602.

In the event the IEEE 754 exception is not masked by the TEM field, the FTT field is set to IEEE_754_exception at step 614. Step 614 also sets the bit corresponding to the occurred IEEE 754 exception in the CEXC field and executes the appropriate exception handler. The AEXC field bits are left unchanged during this step.

Returning now to step 608, if the instruction causing the IEEE 754 exception is an SIMD instruction, step 616 examines if the exception is masked by the TEM field. If the exception is not masked, step 618 clears both the AEXC field and the CEXC field, and sets the FTT field to indicate an unfinished_FPop exception has occurred. Once the unfinished_FPop exception handler is called, it is contemplated software can then determine which of the SIMD sub-operation(s) actually generated the exception by emulating the sub-instructions individually.

If step 616 determines that the IEEE 754 exception is masked, step 620 carries out a logical OR of the corresponding IEEE 754 exception bit(s) resulting from the sub-instructions with the previous AEXC field, and places the resulting value back in the AEXC field. It is contemplated software can later determine which of the sub-operations of the SIMD instruction actually caused the exception to occur. Next, optional step 622 clears the CEXC field. At step 602 the next instruction is executed.

The present invention thus provides support for IEEE 754 exceptions generated by SIMD instructions without making architectural modifications to floating-point state registers. The floating point state register (FSR) is maintained in a consistent manner for both SIMD and regular floating-point instructions. If a SIMD instruction generates an IEEE 754 exception, the invention allows software to determine which sub-operation(s) actually generated the exception without changing current processor hardware design or effecting normal floating-point exception handling.

The benefits of such a arrangement include straight-forward IEEE 754 exception handling and a consistent definition of the floating-point status register (FSR) for SIMD capable processors. Moreover, hardware is simplified by the present invention since maintaining multiple copies of the trap enable mask (TEM) and the exception flags (AEXC and CEXC) for each sub-instructions is avoided.

Although the invention has been described and illustrated with a certain degree of particularity, it is understood that the present disclosure has been made only by way of example, and that numerous changes, combinations and arrangements of techniques can be resorted to by those skilled in the art without departing from the spirit and scope of the invention, as hereinafter claimed.

The invention claimed is:

1. A method for handling IEEE 754 standard exceptions, the method comprising:
   employing a floating-point status register to report IEEE 754 exceptions comprising:
      providing a floating-point trap type field within said floating-point status register, said floating-point trap type field configured to indicate a floating-point exception cause;
      providing a trap enable mask field within said floating-point status register, said trap enable mask field configured to selectively mask or enable IEEE 754 standard exceptions, wherein the trap enable mask field includes flags corresponding to each of the IEEE 754 standard exceptions;
      providing a current exception field within said floating-point status register, said current exception field configured to indicate the occurrence of enabled IEEE 754 standard exceptions, wherein the current exception field includes flags corresponding to each of the IEEE 754 standard exceptions;
      providing an accrued exception field within said floating-point status register, said accrued exception field configured to indicate the occurrence of masked IEEE 754 standard exceptions, wherein the accrued exception field includes flags corresponding to each of the IEEE 754 standard exceptions;
   executing a first instruction;
   determining if an IEEE 754 exception occurred during execution of said first instruction;
   if an IEEE 754 exception did not occur during execution of said first instruction, clearing said current exception field and executing a next instruction;
   if executing said first instruction results in an IEEE 754 exception, determining if said first instruction was an SIMD instruction;
   if said first instruction was a regular non-SIMD instruction, determining if said IEEE 754 exception is masked by said trap enable mask field;
   if said IEEE 754 exception is masked by said trap enable mask field, logically ORing the corresponding IEEE 754 exception bit with a previous accrued exception field value, to create an updated accrued exception value, and placing said updated accrued exception value in said accrued exception field and clearing said current exception field;
   if said IEEE 754 exception is not masked by said trap enable mask field, setting said floating-point trap type field to IEEE 754 exception and setting a bit corresponding to the occurred IEEE 754 exception in said current exception field and executing an appropriate exception handler;
   if said first instruction causing said IEEE 754 exception is a SIMD instruction, determining if said IEEE 754 exception is masked by said trap enable mask field;
   if said IEEE 754 exception is not masked, clearing both said accrued exception field and said current exception field, and setting said floating-point trap type field to indicate an unfinished FPop exception has occurred and determining which of said SIMD sub-instructions generated said IEEE 754 exception;
   if said IEEE 754 exception is masked, logically ORing corresponding IEEE 754 exception bits resulting from said SMID sub-instructions with a previous accrued exception field value, to create an updated accrued exception value and placing said updated accrued exception value in said accrued exception field and clearing said current exception field.

2. An apparatus suitable for handling an IEEE 754 standard exception, the apparatus comprising:
   a floating-point status register to report IEEE 754 exceptions generated from one or more instructions, said floating-point status register comprising:
      a trap enable mask field configured to selectively mask or enable IEEE 754 standard exceptions, wherein the trap enable mask field includes flags corresponding to each of the IEEE 754 standard exceptions;
      an accrued exception field configured to indicate the occurrence of masked IEEE 754 standard exceptions, wherein the accrued exception field includes flags corresponding to each of the IEEE 754 standard exceptions;
      "OR" logic operatively coupled to the accrued exception field to generate a bit-wise logical "OR" of corresponding exception flags of the sub-operations with the accrued exception field if the trap enable mask field is configured to mask the exception;
   said apparatus suitable for handling an IEEE 754 standard exception capable of executing a first instruction of said one or more instructions and determining if an IEEE 754 exception occurred during execution of said first instruction; wherein,
      if an IEEE 754 exception did not occur during execution of said first instruction, said current exception field is cleared and a next instruction is executed; further wherein,
      if executing said first instruction results in an IEEE 754 exception, it is determined if said first instruction was an SIMD instruction; further wherein,
      if said first instruction was a regular non-SIMD instruction, it is determined if said IEEE 754 exception is masked by said trap enable mask field; further wherein,
      if said IEEE 754 exception is masked by said trap enable mask field, the corresponding IEEE 754 exception bit is logically ORed with a previous accrued exception field value, to create an updated accrued exception value, and said updated accrued exception value is placed in said accrued exception field and said current exception field is cleared; further wherein, if said IEEE 754 exception is not masked by said trap enable mask field, said floating-point trap type field is set to IEEE 754 exception and a bit corresponding to the occurred IEEE 754 exception is set in said current exception field and an appropriate exception handler is executed; further wherein, if said first instruction causing said IEEE 754 exception is a SIMD instruction, it is determined if said IEEE 754 exception is masked by said trap enable mask field; further wherein, if said IEEE 754 exception is not masked, both said accrued exception field and said current exception field are cleared and said floating-point trap type field is set to indicate an unfinished FPop exception has occurred and it is determined which of said SIMD sub-instructions generated said IEEE 754 exception; further wherein, if said IEEE 754 exception is masked, corresponding IEEE 754 exception bits resulting from said SMID sub-instructions are logically ORed with a previous accrued exception field value, to create an updated accrued exception value and said updated accrued exception value is placed in said accrued exception field and said current exception field is cleared.

* * * * *